United States Patent
Lee

(10) Patent No.: US 10,146,847 B2
(45) Date of Patent: *Dec. 4, 2018

(54) APPARATUS AND METHOD FOR MANAGING PHONE NUMBER-BASED SNS ACCOUNT

(71) Applicant: SK PLANET CO., LTD., Seongnam-si, Gyeonggi-do (KR)

(72) Inventor: Sang Yool Lee, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,505

(22) Filed: Aug. 3, 2016

(65) Prior Publication Data

US 2016/0342676 A1 Nov. 24, 2016

Related U.S. Application Data

(63) Continuation of application No. 14/117,644, filed as application No. PCT/KR2013/006254 on Jul. 12, 2013, now Pat. No. 9,449,066.

(30) Foreign Application Priority Data

Aug. 29, 2012 (KR) .......................... 10-2012-0094663

(51) Int. Cl.
*H04L 29/08* (2006.01)
*G06F 17/30* (2006.01)
(Continued)

(52) U.S. Cl.
CPC ....... *G06F 17/30578* (2013.01); *G06Q 50/01* (2013.01); *G06Q 50/32* (2013.01);
(Continued)

(58) Field of Classification Search
CPC ........ G06F 17/30578; G06F 17/30365; G06Q 50/01; G06Q 50/32; H04L 51/00;
(Continued)

(56) References Cited

U.S. PATENT DOCUMENTS 5,754,526 A * 5/1998 Kaneko ............. H04Q 11/0428
370/217
7,673,327 B1 3/2010 Polis et al.
(Continued)

FOREIGN PATENT DOCUMENTS

| CN | 102056106 A | 5/2011 |
| CN | 102571619 A | 7/2012 |

(Continued)

OTHER PUBLICATIONS

Burke, "Growing Close on Facebook: Changes in Tie Strength Through Social Network Site Use", CHI 2014, Apr. 26-May 1, 2014, Toronto, Canada. pp. 4187-4196.*

(Continued)

*Primary Examiner* — Luu T Pham
*Assistant Examiner* — Walter J Malinowski
(74) *Attorney, Agent, or Firm* — Brinks Gilson & Lione

(57) ABSTRACT

A system and method for managing a phone number-based Social Network Service (SNS) account. When a phone number change schedule information is received from the user terminal, a phone number change schedule message to user terminals included in a friend list of the corresponding account confirms when authentication of the new SNS account is requested from the user terminal, whether or not the account is an account of the changed phone number for the new authentication request based on the previously transmitted phone number change schedule information. If the account is an account of the changed phone number, a phone number change notification message is transmitted to (Continued)

user terminals in a friend list of the account of the changed phone number. Friends linked to the user of the SNS account are correctly informed of information on the change of the phone number.

5 Claims, 5 Drawing Sheets

(51) Int. Cl.
G06Q 50/00 (2012.01)
G06Q 50/32 (2012.01)
H04L 29/06 (2006.01)
H04L 12/58 (2006.01)
H04L 29/12 (2006.01)
H04W 4/21 (2018.01)

(52) U.S. Cl.
CPC .......... *H04L 51/32* (2013.01); *H04L 61/2076* (2013.01); *H04L 63/08* (2013.01); *H04L 67/1095* (2013.01); *H04W 4/21* (2018.02); H04L 61/605 (2013.01)

(58) Field of Classification Search
CPC ... H04L 51/32; H04L 61/2076; H04L 61/605; H04L 63/08; H04L 67/1095; H04W 4/206
USPC ................................................. 726/7; 709/204
See application file for complete search history.

(56) References Cited

U.S. PATENT DOCUMENTS

| | | | |
|---|---|---|---|
| 7,886,000 B1 | 2/2011 | Polis et al. | |
| 7,995,075 B2* | 8/2011 | Yang | G06T 1/00 345/418 |
| 8,600,360 B1* | 12/2013 | Patvarczki | H04L 67/24 379/201.02 |
| 8,606,869 B2 | 12/2013 | Stibel et al. | |
| 8,788,464 B1 | 7/2014 | Lola et al. | |
| 9,412,120 B1* | 8/2016 | Bitoun | G06Q 30/0267 |
| 9,652,810 B2* | 5/2017 | Richter | G06Q 10/107 |
| 9,916,369 B2* | 3/2018 | Pearson | G06F 17/30569 |
| 10,026,086 B2* | 7/2018 | Zha | G06Q 20/4016 |
| 2003/0198338 A1 | 10/2003 | Bai | |
| 2004/0128151 A1* | 7/2004 | Mock | G06Q 10/10 709/204 |
| 2004/0260726 A1 | 12/2004 | Hrle et al. | |
| 2005/0131990 A1 | 6/2005 | Jewell | |
| 2007/0127656 A1 | 6/2007 | Citron et al. | |
| 2008/0114855 A1* | 5/2008 | Welingkar | G06Q 20/12 709/217 |
| 2008/0115226 A1 | 5/2008 | Welingkar et al. | |
| 2008/0299953 A1 | 12/2008 | Rao | |
| 2009/0187607 A1* | 7/2009 | Yoo | H04L 67/1095 |
| 2010/0005520 A1 | 1/2010 | Abbot et al. | |
| 2010/0017470 A1* | 1/2010 | Hyoung | H04L 51/04 709/204 |
| 2010/0030858 A1* | 2/2010 | Chasin | G06Q 10/107 709/206 |
| 2010/0179868 A1* | 7/2010 | del Rosario | G06Q 30/0214 705/14.16 |
| 2010/0250592 A1* | 9/2010 | Paquet | G06Q 10/10 707/770 |
| 2010/0285787 A1* | 11/2010 | Matsuda | H04M 1/274516 455/418 |
| 2010/0299253 A1* | 11/2010 | Patterson | G06Q 10/06 705/40 |
| 2010/0306099 A1 | 12/2010 | Hirson et al. | |
| 2011/0047245 A1 | 2/2011 | Abramson et al. | |
| 2011/0078184 A1 | 3/2011 | Song et al. | |
| 2011/0110513 A1 | 5/2011 | Park | |
| 2011/0235790 A1* | 9/2011 | Strope | H04L 12/66 379/93.02 |
| 2011/0264684 A1* | 10/2011 | Shafigi | G06F 17/30867 707/769 |
| 2012/0010923 A1* | 1/2012 | Yarmolich | G06Q 20/10 705/7.32 |
| 2012/0046054 A1* | 2/2012 | Celik | H04M 1/274516 455/466 |
| 2012/0059922 A1* | 3/2012 | Jason | H04L 12/14 709/223 |
| 2012/0101899 A1* | 4/2012 | Langos | G06Q 30/0255 705/14.53 |
| 2012/0109890 A1 | 5/2012 | Lee et al. | |
| 2012/0117168 A1* | 5/2012 | Sugiyama | G06F 9/5055 709/206 |
| 2012/0124150 A1 | 5/2012 | Ge | |
| 2012/0136917 A1 | 5/2012 | Abramson et al. | |
| 2012/0150921 A1 | 6/2012 | Yamakawa | |
| 2012/0157066 A1* | 6/2012 | Hwang | H04M 1/274516 455/414.2 |
| 2012/0166255 A1* | 6/2012 | Rizk | G06Q 50/01 705/12 |
| 2012/0178536 A1 | 7/2012 | Oh et al. | |
| 2012/0209926 A1* | 8/2012 | Backholm | G06Q 50/01 709/206 |
| 2012/0324009 A1* | 12/2012 | Lee | H04L 12/588 709/204 |
| 2013/0073280 A1* | 3/2013 | O'Neil | G06F 17/2881 704/9 |
| 2013/0133055 A1* | 5/2013 | Ali | H04L 63/0861 726/7 |
| 2013/0137479 A1* | 5/2013 | Baek | H04M 1/274516 455/550.1 |
| 2013/0151632 A1* | 6/2013 | Chodavarapu | G06Q 50/01 709/206 |
| 2013/0152184 A1* | 6/2013 | Wang | H04L 51/32 726/7 |
| 2013/0159435 A1* | 6/2013 | Liu | H04W 4/206 709/206 |
| 2013/0237200 A1* | 9/2013 | Nystrom | H04W 8/20 455/418 |
| 2013/0262514 A1* | 10/2013 | Everett | G06F 21/6245 707/781 |
| 2013/0339464 A1 | 12/2013 | Goudarzi et al. | |
| 2014/0032612 A1* | 1/2014 | Kesavan | G06Q 10/1093 707/803 |
| 2014/0273980 A1* | 9/2014 | Regan | H04W 8/20 455/413 |
| 2016/0127287 A1* | 5/2016 | Oh | H04L 12/1831 715/752 |
| 2016/0300230 A1* | 10/2016 | Cha | H04W 12/08 |

FOREIGN PATENT DOCUMENTS

| | | | |
|---|---|---|---|
| CN | 102831202 A | 12/2012 | |
| CN | 102984181 A | 3/2013 | |
| CN | 102999527 A | 3/2013 | |
| KR | 20040034060 A | * 4/2004 | |
| KR | 1020040034060 A | 4/2004 | |
| KR | 1020050014194 A | 2/2005 | |
| KR | 20120046410 A | * 5/2012 | |
| KR | 1020120046410 A | 5/2012 | |
| KR | 1020120059507 A | 6/2012 | |
| SG | 183552 A1 | 10/2012 | |
| WO | WO 2011108844 A2 | * 9/2011 | .......... H04L 12/588 |
| WO | 2012000229 A1 | 1/2012 | |
| WO | 2012034539 A1 | 3/2012 | |
| WO | WO 2013085144 A1 | * 6/2013 | ............. H04L 51/32 |
| WO | WO 2014035051 A1 | * 3/2014 | ............. G06Q 50/01 |
| WO | WO-2014035051 A1 | * 3/2014 | ............. G06Q 50/01 |

OTHER PUBLICATIONS

Epp, "Relationship Management: Secure Collaboration in a Ubiquitous Environment", IEEE CS and IEEE ComSoc, 2003, pp. 62-71.*

(56) References Cited

OTHER PUBLICATIONS

Park, "The Economic Impact of Wireless Number Portability", The Journal of Industrial Economics, 59, 2010, pp. 714-745. (Year: 2010).*

Cui, Yanqing, Mikko Honkala, Kari Pihkala, Kimmo Kinnunen, and Guido Grassel. "Linked internet UI: a mobile user interface optimized for social networking." In Proceedings of the 12th international conference on Human computer interaction with mobile devices and services, pp. 45-54. ACM, 2010. (Year: 2010).*

Nylander, Stina, Markus Bylund, and Annika Waern. "Ubiquitous service access through adapted user interfaces on multiple devices." Personal and Ubiquitous Computing 9, No. 3 (2005): 123-133 (Year: 2005).*

Alkhateeb, Faisal. "A mobile-based service for building social networks for mobile users." In Intelligent Systems, Modelling and Simulation (ISMS), 2012 Third International Conference on, pp. 545-549. IEEE, 2012. (Year: 2012).*

Adam, Nabil, Jayan Eledath, Sharad Mehrotra, and Nalini Venkatasubramanian. "Social media alert and response to threats to citizens (SMART-C)." In Collaborative Computing: Networking, Applications and Worksharing (CollaborateCom), 2012 8th International Conference on, pp. 181-189. IEEE, 2012. (Year: 2012).*

International Search Report dated Oct. 18, 2013 for PCT/KR2013/006254.

Kakao Talk, Android Kakao Talk Android App, http://blog.naver.com/redieye?Redirect=Log&logNo=10116683256, Aug. 22, 2011.

Kim, "On social Web sites", Information Systems 35, Elsevier B.V., 2009, pp. 215-236.

Boutin, "12 Things You Didn't Know Facebook Could Do", New York Times, Nov. 30, 2011, 10 pages.

IPCOM_000208551, "System and method of an automatic mobile number refresh in cloud environment", Jul. 13, 2011, 6 pages.

Kletzmann, "Social media? Get serious! Understanding the functional building blocks of social media", Business Horizons, 2011, vol. 54, pp. 241-251.

Schwartzberg, "Has Facebook got your mobile number? Now your friends do too", Naked Security, Aug. 11, 2011, 34 pages.

* cited by examiner

APPARATUS AND METHOD FOR MANAGING PHONE NUMBER-BASED SNS ACCOUNT

CROSS REFERENCE TO RELATED APPLICATION

The present application is a continuation of the U.S. patent application Ser. No. 14/117,644, filed on Nov. 14, 2013, which is a U.S. National Phase Entry of International Patent Application No. PCT/KR2013/006254 filed Jul. 12, 2013, which is based upon and claims the benefit of priority to Korean Patent Application No. 10-2012-0094663, filed on Aug. 29, 2013. The disclosures of the above-listed applications are hereby incorporated by reference herein in their entirety.

TECHNICAL FIELD

The present invention relates to a system and method for managing a phone number-based Social Network Service (SNS) account, and more specifically, to a system and method for managing a Phone number-based Social Network Service (SNS) account, which informs a counterpart registered as a friend in real-time that a previous phone number does not represent a corresponding user any more when the user changes the phone number of the phone number-based SNS account.

BACKGROUND ART

An SNS account generally uses a method based on a cellular phone number in the present, and creation of an account is accomplished through one Short Message Service (SMS) authentication for one cellular phone number. In this method, although a process related to creation of an account is clear, a process related to expiry and deletion of an account is relatively unclear.

When a specific user using an account changes a phone number, a friend knowing only a previous phone number and ignorant, of the new phone number may possibly make a wrong connection if another person acquires the corresponding phone number and registers an account. A technique of tracing a phone number based on a server is required to prevent this problem.

In addition, if an SMS account is created using the new phone number, content of previous dialog windows cannot be transferred. Although the dialog windows can be downloaded as a file, this is merely preservation of data, and continuity of a dialog accomplished in the open windows cannot be provided.

DISCLOSURE OF INVENTION

Technical Problem

Therefore, the present invention has been made in view of the above problems, and it is an object of the present invention is to provide a system and method for managing a phone number-based SNS account, in which since an account management server manages history of changes of a phone number for the phone number-based SNS account, friends linked to the user of the SNS account are correctly informed of information on the change of the phone number.

Another object of the present invention is to provide a system and method for managing a phone number-based SNS account, which can guarantee continuity of a dialog by using a previous dialog window as is even after the phone number is changed.

Technical Solution

To accomplish the above objects, according to one aspect of the present invention, there is provided a phone number-based SNS account management system including: a user terminal for transmitting, if a phone number is changed while a phone number-based SNS account is used, phone number change schedule information and requesting authentication of a new SNS account for an acquired new phone number; and an SNS account management server for transmitting, when the phone number change schedule information is received from the user terminal, a phone number change schedule message to user terminals respectively corresponding to each of friend accounts included in a friend list of the corresponding account, confirming, when authentication of the new SNS account is requested from the user terminal, whether or not the account is an account of the changed phone number for the new authentication request based on the previously transmitted phone number change schedule information, transmitting, if the account is an account of the changed phone number, a phone number change notification message to user terminals respectively corresponding to each of friend accounts included in a friend list of the account of the changed phone number, and updating the phone number of the user terminal of the changed phone number in a database or each friend account included in the friend list, of the account of the changed phone number.

Here, the SNS account management server backs up, when the phone number change schedule information is received, content of a dialog window activated on the user terminal and sets the dialog window to a frozen state, confirms, when authentication of a new SNS account is requested from the user terminal, whether or not the account is an account of the changed phone number for the new authentication request based on the previously transmitted phone number change schedule information, links, if the account is an account of the changed phone number, content of a dialog window existed before the change of the phone number to the new account and provides a seamless dialog window by releasing the frozen state.

In addition, when authentication of a new SINS account is requested from the user terminal, the SNS account management server selects user terminals for receiving the phone number change notification message among the user terminals respectively corresponding to each of the friend accounts included in the friend list of the corresponding account.

According to another aspect of the present invention, there is provided an SNS account management server including: a phone number change account confirmation unit for receiving, if a phone number is changed while a phone number-based SNS account is used, phone number change schedule information from a user terminal, and confirming, when authentication of a new SNS account is requested from the user terminal, whether or not the account is an account of the changed phone number for the new authentication request based on the previously transmitted phone number change schedule information; a phone number change message transmission unit for transmitting, when the phone number change schedule information is received, a phone number change schedule message to user terminals respectively corresponding to each of friend accounts included in a friend list of the corresponding account, and transmitting a phone number change notification message to user terminals respectively corresponding to each of friend accounts included in a friend list of the account of the changed phone number; a phone number update unit for updating the phone number of the user terminal of the changed phone number in a database of each friend account included in the friend list of the account of the changed phone number; and a dialog window processing unit for backing up, when the phone number change schedule information is received from the user terminal, content of a dialog window activated on the user terminal and setting the dialog window to a frozen state, and linking, when authentication of a new SNS account is requested from the use terminal, content of a dialog window existed before the change of the phone number to the new account; and providing a seamless dialog window by releasing the frozen state.

Here, when authentication of a new SNS account is requested from the user terminal, the phone number change account confirmation unit acquires information on possession of a previous account, information on a previous phone number and information on a password in association with the user terminal and confirms whether or not the account is an account of the changed phone number referring to the acquired information on possession of a previous account, information on a previous phone number and information a password and the previously transmitted phone number change schedule information.

In addition, when authentication of a new SNS account is requested from the user terminal, the phone number change message transmission unit selects user terminals for receiving the phone number change notification message among the user terminals respectively corresponding to each of the friend accounts included in the friend list of the corresponding account.

In addition, the phone number change message transmission unit provides the phone number change schedule message to the user terminal in a form of an icon change, a character message or a notification window.

According to still another aspect of the present invention, there is provided a phone number-based Social Network Service (SNS) account management method performed by an SNS management server, the method including the steps of: receiving, if a phone number is changed while a phone number-based SNS account is used, phone number change schedule information from a user terminal; transmitting, when the phone number change schedule information is received, a phone number change schedule message to user terminals respectively corresponding to each of friend accounts included in a friend list of the corresponding account; confirming, when authentication of a new SNS account is requested for a new phone number from the user terminal, whether or not the account is an account of the changed phone number for the new authentication request based on the previously transmitted phone number change schedule information; transmitting, if the account is an account of the changed phone number as a result of the confirmation, a phone number change notification message to user terminals respectively corresponding to each of friend accounts included in a friend list, of the account of the changed phone number; and updating the phone number of the user terminal of the changed phone number in a database of each friend account included in the friend list of the account of the changed phone number.

Here, when authentication of a new SNS account is requested from the user terminal, the step of confirming whether or not the account is an account of the changed phone number acquires information on possession of a previous account, information on a previous phone number and information on a password in association with the user terminal and confirms whether or not the account is an account of the changed phone number referring to the acquired information on possession of a previous account, information on a previous phone number and information on a password and the previously transmitted phone number change schedule information.

In addition, the step of transmitting a phone number change notification message selects user terminals for receiving the phone number change notification message among the user terminals respectively corresponding to each of the friend accounts included in the friend list of the account of the changed phone number in association with the user terminal of the changed phone number and transmits the phone number change notification message including information on the new phone number of the account of the changed phone number only to the user terminals corresponding to selected the friend accounts.

In addition, the step of transmitting a phone number change notification message allows a user terminal receiving the phone number change notification message to determine whether or not to update registration of the friend of the account of the changed phone number.

According to still another aspect of the present invention, there is provided a phone number-based Social Network Service (SNS) account management method performed by an SNS management server, the method including the steps of: receiving, if a phone number is changed while a phone number-based SNS account is used, phone number change schedule information from a user terminal; backing up, when the phone number change schedule information is received, content of a dialog window activated on the user terminal and setting the dialog window to a frozen state; confirming, when authentication of a new SNS account is requested from the user terminal, whether or not the account is an account of the changed phone number for the new authentication request based on the previously transmitted phone number change schedule information; linking, if the account is an account of the changed phone number as a result of the confirmation, content of a dialog window existed before the change of the phone number to the new account; and providing a seamless dialog window by releasing the frozen state.

Here, the step of setting the dialog window to a frozen state sets one or more dialog windows activated on the user terminal to the frozen state.

According to still another aspect of the present invention, there is provided a recording medium for recording a phone number-based. SNS account management method as a program that can be read by an electronic apparatus, the method including the steps of: receiving, if a phone number is changed while a phone number-based. SNS account is used, phone number change schedule information from a user terminal; transmitting, when the phone number change schedule information is received, a phone number change schedule message to user terminals respectively corresponding to each of friend accounts included in a friend list of the corresponding account; confirming, when authentication of a new SNS account is requested for a new phone number from the user terminal, whether or not the account is an account of the changed phone number for the new authentication request based on the previously transmitted phone number change schedule information; transmitting, if the account is an account of the changed phone number as a result of the confirmation, a phone number change notification message to user terminals respectively corresponding to each of friend accounts included in a friend list, of the account of the changed phone number; and updating the phone number of the user terminal of the changed phone number in a database of each friend account included in the friend list of the account of the changed phone number.

According to still another aspect of the present invention, there is provided a recording medium for recording a phone number-based SNS account management method as a program that can be read by an electronic apparatus, the method including the steps of: receiving, if a phone number is changed while a phone number-based. SNS account is used, phone number change schedule information from a user terminal; backing up, when the phone number change schedule information is received, content of a dialog window activated on the user terminal and setting the dialog window to a frozen state; confirming, when authentication of a new SNS account is requested from the user terminal, whether or not the account is an account of the changed phone number for the new authentication request based on the previously transmitted phone number change schedule information; linking, if the account is an account of the changed phone number as a result of the confirmation, content of a dialog window existed before the change of the phone number to the new account; and providing a seamless dialog window by releasing the frozen state.

Advantageous Effects

As described above, the present invention may provide a system and method for managing a phone number-based SNS account, in which since an account management server manages history of changes of a phone number for the phone number-based SNS account, friends linked to the user of the SNS account are correctly informed of information on the change of the phone number.

In addition, the present invention may provide a system and method for managing a phone number-based SNS account, which may guarantee continuity of a dialog through a dialog window since a previously opened dialog window can be transferred as is even after the phone number is changed.

DESCRIPTION OF SYMBOLS

Figure 1:
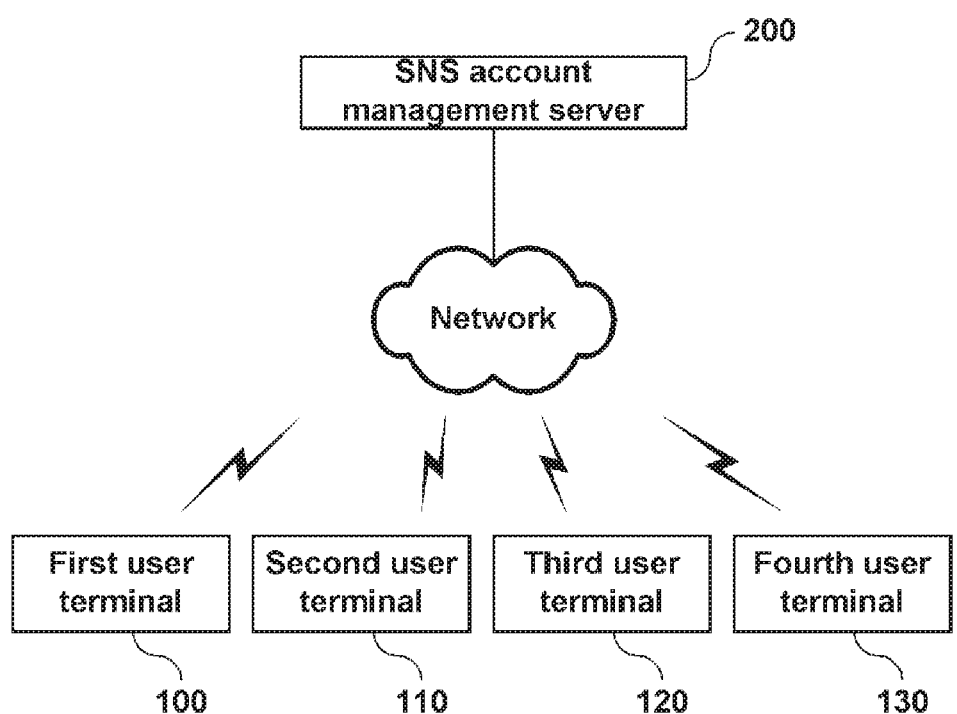
FIG. 1 is a view showing the configuration of a phone number-based SNS account management system according to an embodiment of the present invention.

100: First user terminal 200: SNS account management server
210: Phone number change account confirmation unit
212: Phone number change message transmission unit
214: Phone number update unit 216: Dialog window processing unit

BEST MODE FOR CARRYING OUT THE INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

FIG. 1 is a view showing the configuration of a phone number-based SNS account management system according to an embodiment of the present invention.

Referring to FIG. 1, the phone number-based SNS account management system includes a first user terminal 100, a second user terminal 110, a third user terminal 120, a fourth user terminal 130 and an SNS account management server 200.

If a phone number is changed while a phone number-based SNS account is used, the first user terminal 100 transmits phone number change schedule information to SNS account management server 200.

In addition, the first user terminal 100 requests authentication of a new SNS account for an acquired new phone number from the SNS account management server 200.

Meanwhile, if the phone number change schedule information is received from the first user terminal 100, the SNS account management server 200 transmits a phone number change schedule message to user terminals respectively corresponding to each of friend accounts included in a friend list of the corresponding account, for example, the second user terminal 110, the third user terminal 120 and the fourth user terminal 130.

In addition, when authentication of a new SNS account is requested from the first user terminal 100, the SNS account management server 200 confirms whether or not the account is an account of the changed phone number for the new authentication request based on the previously transmitted phone number change schedule information, and if the account is an account of the changed phone number, the SNS account management server 200 transmits a phone number change notification message to the user terminals respectively corresponding to each of the friend accounts included in the friend list of account of the changed phone number (for example the second user terminal 110, the third user terminal 120 or the fourth user terminal 130).

At this point, when authentication. Or a new SNS account is requested from the first user terminal 100, the SNS account management server 200 may select user terminals receiving the phone number change notification message among the user terminals respectively corresponding to each of the friend accounts included in the friend list of the corresponding account.

In addition, the SNS account management server 200 updates the phone number of the user terminal of the changed phone number with a new phone number in the database of each friend account included in the friend list of the account of the changed phone number.

Meanwhile, if the phone number change schedule information is received from the first user terminal 100, the SNS account management server 200 backs up content of a dialog window activated on the first user terminal 100 and sets the dialog window to a frozen state.

In addition, when authentication of a new SNS account is requested from the first user terminal 100, the SNS account management server 200 confirms whether or not the account is an account of the changed phone number for the new authentication request based on the previously transmitted phone number change schedule information, and if the account is an account of the changed phone number, the SNS account management server 200 links content of a dialog window existed before the change of the phone number to the new account and provides a seamless dialog window by releasing the frozen state.

Figure 2:
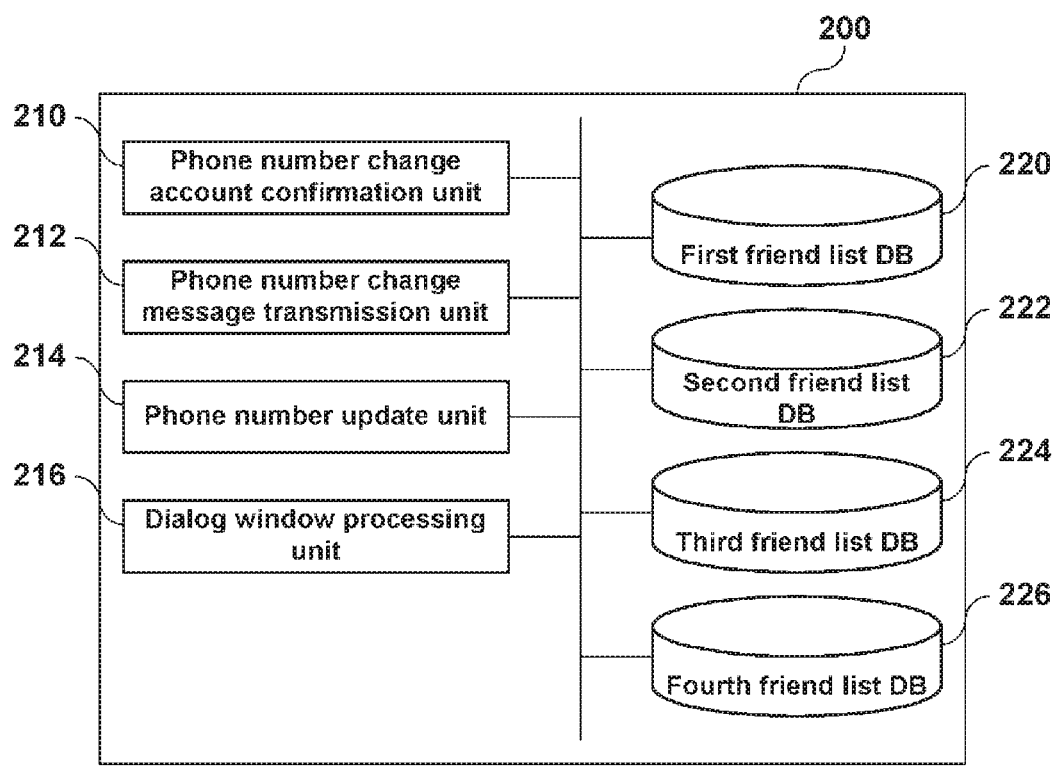
FIG. 2 is a view showing the internal configuration of an SNS account management server according to an embodiment of the present invention.
Figure 3:
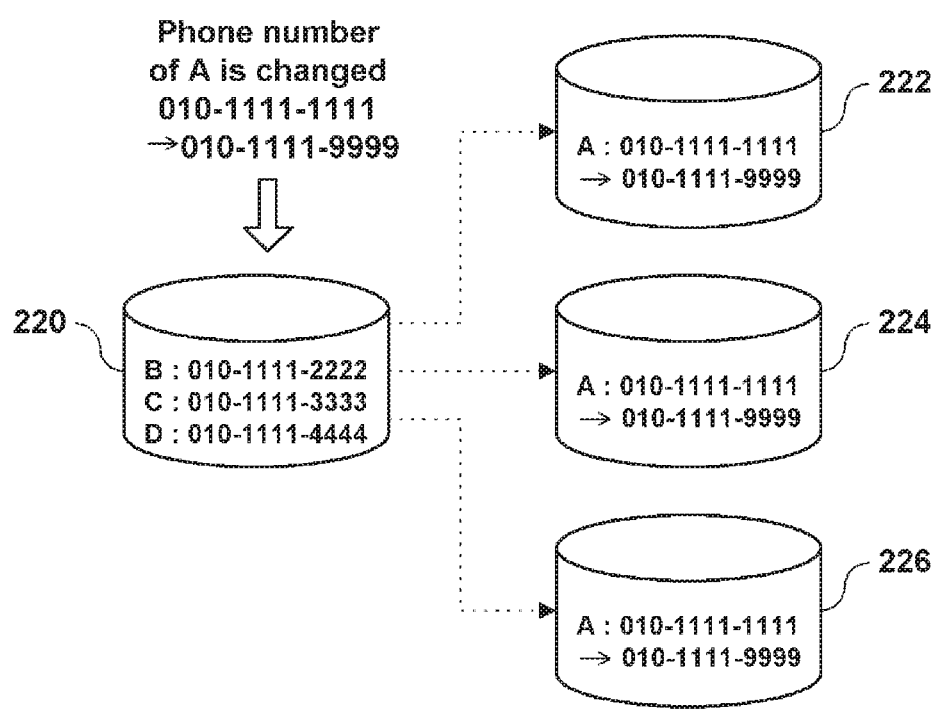
FIG. 3 is an exemplary view showing the process of updating a changed phone number by an SNS account management server according to the present invention.

FIG. 2 is a view showing the internal configuration of an SNS account management server according to an embodiment of the present invention, and FIG. 3 is an exemplary view showing the process of updating a changed phone number by an SNS account management server according to the present invention.

Referring to FIG. 2, the SNS account management server 200 according to an embodiment of the present invention includes a phone number change account confirmation unit 210, a phone number change message transmission unit 212, a phone number update unit 214, a dialog window processing unit 216 and one or more friend list databases 220, 222, 224 and 226.

The phone number change account confirmation unit 210 receives the phone number change schedule information from the user terminal if a phone number is changed while a phone number-based SNS account is used and confirms whether or not the account is an account of the changed phone number for the new authentication request based on the previously transmitted phone number change schedule information when authentication of a new SNS account is requested from the first user terminal 100.

At this point, when authentication of a new SNS account is requested from the user terminal, the phone number change account confirmation unit 210 may acquire information on possession of a previous account, information on a previous phone number and information on a password in association with the user terminal and confirm whether or not the account is an account of the changed phone number referring to the acquired information on possession of a previous account, information on a previous phone number and information on a password and the previously transmitted phone number change schedule information.

In addition, when the phone number change schedule information is received, the phone number change message transmission unit 212 transmits a phone number change schedule message to user terminals respectively corresponding to each of the friend accounts included in the friend list of the corresponding account, and if the account is an account of the changed phone number as a result of confirming whether or not the account is an account of the changed phone number, the phone number change message transmission unit 212 transmits a phone number change notification message to the user terminals respectively corresponding to each of the friend accounts included in the friend list of the account of the changed phone number.

At this point, when authentication of a new SNS account is requested from the user terminal, the phone number change message transmission unit 212 may select user terminals for receiving the phone number change notification message among the user terminals respectively corresponding to each of the friend accounts included in the friend list of the corresponding account.

In addition, the phone number change message transmission unit 212 may provide the phone number change schedule message to the user terminals in the form of an icon change, a character message or a notification window.

In addition, if the account is an account of the changed phone number as a result of confirming whether or not the account is an account of the changed phone number, the phone number update unit 214 updates the phone number of the user terminal of the changed phone number in the database of each friend account included in the friend list of the account of the changed phone number.

For example, as shown in FIG. 3, information on the phone numbers of B, C and D is stored in a first friend list database 220 as a friend list of A, information on the phone numbers of B's friends including information on the phone number of A is stored in a second friend list database 222, information on the phone numbers of C's friends including information on the phone number of A is stored in a third friend list database 224, and information on the phone numbers of D's friends including information on the phone number of A is stored in advance in a fourth friend list database 226.

At this point, if the A's phone number is changed from 010-1111-1111 to 010-1111-9999, the phone number update unit 214 updates information on the A's phone number from 010-1111-1111 to 010-1111-9999 in the databases 222, 224 and 226 of B, C and D stored in the friend list database 220 of A.

Meanwhile, if the phone number change schedule information is received from the user terminal, the dialog window processing unit 216 backs up content of a dialog window activated on the user terminal and sets the dialog window to a frozen state, and when authentication of a new SNS account is requested from the user terminal, the dialog window processing unit 216 links content of a dialog window existed before the change of the phone number to the new account and provides a seamless dialog window by releasing the frozen state.

Figure 4:
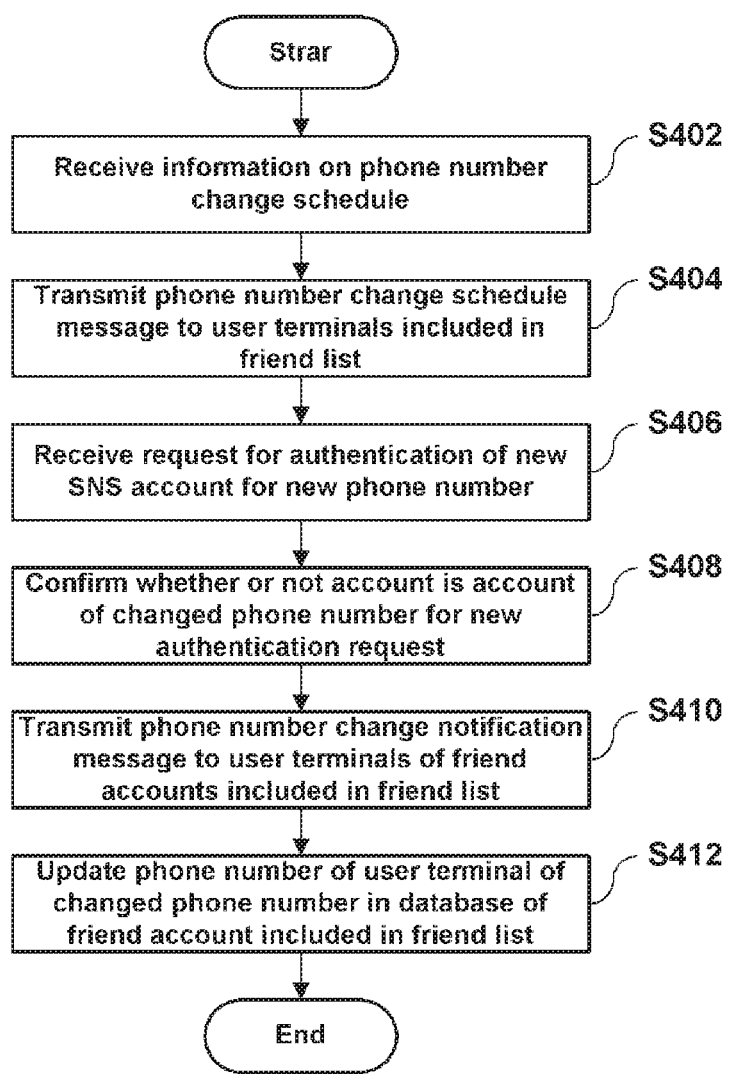
FIG. 4 is flowchart illustrating a phone number-based SNS account management method according to a first embodiment of the present invention.

FIG. 4 is flowchart illustrating a phone number-based SNS account management method according to a first embodiment of the present invention.

Referring to FIG. 4, if a phone number is changed while a phone number-based SNS account is used, the SNS account management server receives phone number change schedule information from the user terminal S402. At this point, the SNS account management server may acquire information on a password in association with the user terminal in order to authenticate the account.

In addition, when the phone number change schedule information is received, the SNS account management server transmits a phone number change schedule message to user terminals respectively corresponding to each of friend accounts included in a friend list of the corresponding account S404.

In addition, when authentication of a new SNS account for a new phone number is requested from the user terminal S406, the SNS account management server confirms whether or not the account is an account of the changed phone number for the new authentication request based on the previously transmitted phone number change schedule information S408.

Here, when authentication of a new SNS account is requested from the user terminal, the SNS account management server may acquire information on possession of a previous account, information on a previous phone number and information on a password in association with the user terminal and confirm whether or not the account is an account of the changed phone number referring to the acquired information on possession of a previous account, information on a previous phone number and information on a password and the previously transmitted phone number change schedule information.

In addition, if the account is an account of the changed phone number as a result of confirming whether or not the account is an account of the changed phone number, the SNS account management server transmits a phone number change notification message including information on the new phone number to the user terminals respectively corresponding to each of the friend accounts included in the friend list of the account of the changed phone number S410.

Here, the SNS account management server may select user terminals for receiving the phone number change notification message among the user terminals respectively corresponding to each of the friend accounts included in the friend list of the account of the changed phone number in association with the user terminal of the changed phone number and transmit the phone number change notification message including information on the new phone number of the account of the changed phone number only to the user terminals corresponding to selected the friend accounts.

Meanwhile, the SNS account management server may allow a user terminal receiving the phone number change notification message to determine whether or not to update registration of the friend of the account of the changed phone number.

In addition, the SNS account management server updates the phone number of the user terminal of the changed phone number in the database of each friend account included in the friend list, of the account of the changed phone number S412.

Meanwhile, according to still another embodiment or the present invention, there is provided a recording medium for recording a phone number-based SNS account management method by an SNS account management server as a program that can be read by an electronic apparatus, the method comprising the steps of: receiving, if a phone number is changed while a phone number-based SNS account is used, phone number change schedule information from a user terminal; transmitting, when the phone number change schedule information is received, a phone number change schedule message to user terminals respectively corresponding to each of friend accounts included in friend list of the corresponding account; confirming, when authentication of a new SNS account is requested for a new phone number from the user terminal, whether or not the account is an account of the changed phone number for the new authentication request based on the previously transmitted phone number change schedule information; transmitting, if the account is an account of the changed phone number as a result of the confirmation, a phone number change notification message to user terminals respectively corresponding to each of friend accounts included in friend list of the account of the changed phone number; and updating the phone number of the user terminal of the changed phone number in a database of each friend account included in the friend list of the account of the changed phone number.

In addition, the phone number-based SNS account management method may be created as a program, and codes and code segments configuring the program may be easily inferred by programmers in the art. In addition, the program related to the phone number-based SNS account management method may be stored in an information storage medium (a readable medium) that can be read by an electronic apparatus and read and executed by the electronic apparatus.

Figure 5:
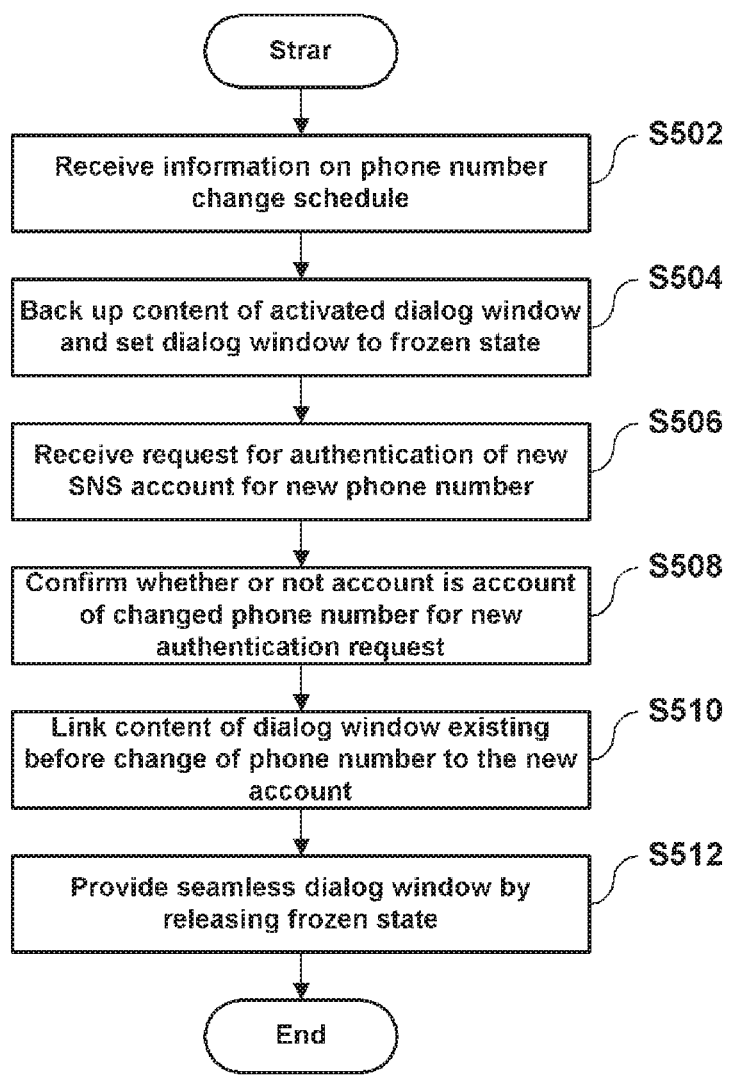
FIG. 5 is flowchart illustrating a phone number-based SNS account management method according to a second embodiment of the present invention.

FIG. 5 is flowchart illustrating a phone number-based SNS account management method according to a second embodiment of the present invention.

Referring to FIG. 5, if a phone number is changed while a phone number-based SNS account is used, the SNS account management server receives phone number change schedule information from the user terminal S502. At this point, the SNS account management server may acquire information on a password in association with the user terminal in order to authenticate the account.

In addition, when the phone number change schedule information is received, the SNS account management server backs up content of a dialog window activated on the user terminal and sets the dialog window to a frozen state (S504) so that a new dialog may not be proceeded.

Here, the SNS account management server may set all dialog windows activated on the user terminal to a frozen state.

In addition, when authentication of a new SNS account for a new phone number is requested from the user terminal S506, the SNS account management server confirms whether or not the account is an account of the changed phone number for the new authentication request based on the previously transmitted phone number change schedule information S508.

In addition, if the account is an account of the changed phone number as a result of confirming whether or not the account is an account of the changed phone number, the SNS account management server links content of a dialog window existed before the change of the phone number to the new account S510.

In addition, the SNS account management server may provide a seamless dialog window by releasing the frozen state so that a user may input a dialog into the dialog window S512.

Meanwhile, according to still another embodiment of the present invention, there is provided a recording medium for recording a phone number-based SNS account management method by an SNS account management server as a program that can be read by an electronic apparatus, the method comprising the steps of: receiving, if a phone number is changed while a phone number-based SNS account is used, phone number change schedule information from a user terminal; backing up, when the phone number change schedule information is received, content of a dialog window activated on the user terminal and setting the dialog window to a frozen state; confirming, when authentication of a new SNS account is requested from the user terminal, whether or not the account is an account of the changed phone number for the new authentication request based on the previously transmitted phone number change schedule information; linking, if the account is an account of the changed phone number as a result of the confirmation, content of a dialog window existed before the change of the phone number to the new account; and providing a seamless dialog window by releasing the frozen state.

In addition, the phone number-based SNS account management method may be created as a program, and codes and code segments configuring the program may be easily inferred by programmers in the art. In addition, the program related to the phone number-based SNS account management method may be stored in an information storage medium. (a readable medium) that can be read by an electronic apparatus and read and executed by the electronic apparatus.

While the present invention has been described with reference to the particular illustrative embodiments, it to be restricted by the embodiments but only by the appended claims. It is to be appreciated that those skilled in the art can change or modify the embodiments without departing from the scope and spirit of the present invention.

INDUSTRIAL APPLICABILITY

According to the present invention, there is provided a system and method for managing a phone number-based SNS account, in which since an account management server manages history of changes of a phone number for the phone number-based SNS account, friends linked to the user of the SNS account are correctly informed of information on the change of the phone number.

The invention claimed is:

1. A Social Network Service (SNS) account management server comprising:
   a phone number change account confirmation unit configured to;
      receive, when a phone number is changed while a phone number-based SNS account is used, phone number change schedule information from a user terminal;
      receive, from the user terminal, a request for authentication of a new SNS account;
      confirm, when the request for authentication of the new SNS account is received from the user terminal, whether the account is an account of the changed phone number for a new authentication request based on the received phone number change schedule information;
   a phone number change message transmission unit configured to:
      transmit, when the phone number change schedule information is received, a phone number change schedule message to respective user terminals corresponding to each friend account included in a friend list of account;
      select, when authentication of the new SNS account is requested from the user terminal, user terminals for transmitting a phone number change notification message among the respective user terminals corresponding to each friend account included in the friend list of the account; and
      transmit the phone number change notification message to the selected user terminals for receiving the phone number change notification message;
   a phone number update unit configured to update the phone number of the user terminal of the changed phone number in a database of each friend account included in the friend list of the account of the changed phone number; and
   a dialog window processing unit configured to:
      back up, when the phone number change schedule information is received from the user terminal, content of a dialog window activated on the user terminal;
      set the dialog window to a frozen state;
      link, when the authentication of the new SNS account is requested from the user terminal, the content of the dialog window that existed before the change of the phone number to the new SNS account; and
      provide a seamless dialog window by releasing the frozen state;
   wherein, when authentication of the new SNS account is requested from the user terminal, the phone number change account confirmation unit is configured to:
      acquire information on possession of a previous account, information on a previous phone number and information on a password in association with the user terminal; and
      confirm whether the account is an account of the changed phone number referring to the acquired information on possession of the previous account, information on the previous phone number and information on a password and a previously transmitted phone number change schedule information.

2. A Social Network Service (SNS) account management system comprising:
   a user terminal configured to;
      transmit, if a phone number is changed while a phone number-based SNS account is used, phone number change schedule information to a SNS account management server; and
      transmit, to the SNS account management server, a request for authentication of a new SNS account for an acquired new phone number; and
   the SNS account management server, wherein the SNS account management server is configured to;
      receive, from the user terminal, the phone number change schedule information;
      receive, from the user terminal, a request for authentication of the new SNS account;
      transmit, when the phone number change schedule information is received from the user terminal, a phone number change schedule message to respective user terminals corresponding to each friend account included in a friend list of the account;
      confirm, when the request for authentication of the new SNS account is received from the user terminal, whether the account is an account of the changed phone number for a new authentication request based on the received phone number change schedule information;
      select, when the request for authentication of the new SNS account is received from the user terminal, user terminals for transmitting the phone number change notification message among the respective user terminals corresponding to each friend account included in the friend list of the account;
      transmit the phone number change notification message to the selected user terminals for receiving the phone number change notification message; and
      update the phone number of the user terminal of the changed phone number in a database of each friend account included in the friend list of the account of the changed phone number;
      when authentication of the new SNS account is requested from the user terminal, acquire information on possession of a previous account, information on a previous phone number and information on a password in association with the user terminal;
      confirm whether the account is an account of the changed phone number referring to the acquired information on possession of the previous account, information on the previous phone number and information on a password and a previously transmitted phone number change schedule information;
      back up, when the phone number change schedule information is received, content of a dialog window activated on the user terminal and sets the dialog window to a frozen state;
      confirm, when authentication of the new SNS account is requested from the user terminal, whether the account is an account of the changed phone number for the new authentication request based on the previously transmitted phone number change schedule information;

link, if the account is an account of the changed phone number, content of a dialog window that existed before the change of the phone number to the new SNS account; and provide a seamless dialog window by releasing the frozen state.

3. A phone number-based Social Network Service (SNS) account management method performed by a SNS management server, the method comprising:

receiving, when a phone number is changed while a phone number-based SNS account is used, phone number change schedule information from a user terminal;

transmitting a phone number change schedule message to respective user terminals corresponding to each friend account included in a friend list of the account;

receiving, from the user terminal, a request for authentication of a new SNS account;

selecting user terminals for transmitting a phone number change notification message among the respective user terminals corresponding to each friend account included in the friend list of the account;

transmitting the phone number change notification message including information on a new phone number of the account of the changed phone number only to the user terminals corresponding to the selected user terminals;

updating the phone number of the user terminal of the changed phone number in a database of each friend account included in the friend list of the account of the changed phone number;

backing up, when a phone number change schedule information is received, content of a dialog window activated on the user terminal and setting the dialog window to a frozen state;

confirming, when the request for authentication of the new SNS account is received from the user terminal, whether the account is an account of the changed phone number for a new authentication request based on the phone number change schedule information;

linking, if the account is an account of the changed phone number as a result of the confirmation, content of a dialog window that existed before the change of the phone number to the new SNS account; and providing a seamless dialog window by releasing the frozen state, wherein when the request for authentication of the new SNS account is received from the user terminal, the confirming whether the account is an account of the changed phone number for the new authentication request includes:

acquiring information on possession of a previous account, information on a previous phone number and information on a password in association with the user terminal, and confirming whether the account is an account of the changed phone number referring to the acquired information on possession of the previous account, information on the previous phone number and information on a password and a previously transmitted phone number change schedule information.

4. The method according to claim 3, wherein the step of transmitting the phone number change notification message allows the user terminal receiving the phone number change notification message to determine whether or not to update registration of the friend of the account of the changed phone number.

5. A non-transitory device-readable medium for recording a phone number-based SNS account management method as a program that can be read by an electronic apparatus, the method comprising the steps of:

receiving, when a phone number is changed while a phone number-based SNS account is used, phone number change schedule information from a user terminal;

transmitting a phone number change schedule message to respective user terminals corresponding to each friend account included in a friend list of the account;

receiving, from the user terminal, a request for authentication of a new SNS account;

confirming, when the request for authentication of the new SNS account is received from the user terminal, whether the account is an account of the changed phone number for a new authentication request based on a previously transmitted phone number change schedule information;

transmitting, based on the confirmation, a phone number change notification message to user terminals respectively corresponding to each friend account included in the friend list of the account;

updating the phone number of the user terminal of the changed phone number in a database of each friend account included in the friend list of the account, backing up, when the phone number change schedule information is received, content of a dialog window activated on the user terminal and setting the dialog window to a frozen state;

linking, when the account is an account of the changed phone number as a result of the confirmation, content of a dialog window that existed before the change of the phone number to the new account; and providing a seamless dialog window by releasing the frozen state;

wherein the transmitting a phone number change notification message comprises:

selecting user terminals for receiving the phone number change notification message among the user terminals respectively corresponding to each of the friend accounts included in the friend list of the account of the changed phone number in association with the user terminal of the changed phone number; and transmitting the phone number change notification message including information on a new phone number of the account of the changed phone number only to the user terminals corresponding to selected the friend accounts, wherein, when the request for authentication of the new SNS account is received from the user terminal, confirming whether the account is an account of the changed phone number for the new authentication request comprises:

acquiring information on possession of a previous account, information on a previous phone number and information on a password in association with the user terminal, and confirming whether the account is an account of the changed phone number referring to the acquired information on possession of the previous account, information on the previous phone number and information on a password and a previously transmitted phone number change schedule information.

\* \* \* \* \*